(12) United States Patent
Bunte et al.

(10) Patent No.: US 9,991,981 B2
(45) Date of Patent: Jun. 5, 2018

(54) METHOD FOR OPERATING A NODE OF A COMMUNICATIONS NETWORK, A NODE AND A COMMUNICATIONS NETWORK

(71) Applicant: BECKHOFF AUTOMATION GMBH, Verl (DE)

(72) Inventors: Thorsten Bunte, Gütersloh (DE); Holger Büttner, Berlin (DE); Dirk Janssen, Verl (DE); Erik Vonnahme, Salzkotten (DE); Thomas Rettig, Rheda-Wiedenbrück (DE); Hans Beckhoff, Verl (DE)

(73) Assignee: BECKHOFF AUTOMATION GMBH, Verl (DE)

( * ) Notice: Subject to any disclaimer, the term of this patent is extended or adjusted under 35 U.S.C. 154(b) by 65 days.

(21) Appl. No.: 14/992,597

(22) Filed: Jan. 11, 2016

(65) Prior Publication Data

US 2016/0127067 A1    May 5, 2016

Related U.S. Application Data

(63) Continuation of application No. PCT/EP2015/057848, filed on Apr. 10, 2015.

(30) Foreign Application Priority Data

Apr. 11, 2014   (DE) .................. 10 2014 105 211

(51) Int. Cl.
    *H04J 3/06*      (2006.01)
    *H04L 12/64*    (2006.01)

(52) U.S. Cl.
    CPC .......... *H04J 3/0658* (2013.01); *H04J 3/0664* (2013.01); *H04L 12/6418* (2013.01)

(58) Field of Classification Search
    None
    See application file for complete search history.

(56) References Cited

U.S. PATENT DOCUMENTS 5,682,384 A * 10/1997 Zarros .................. H04J 3/0632
                                                     370/394
8,370,675 B2 * 2/2013 Kagan .................. H04J 3/0697
                                                     368/46

(Continued)

FOREIGN PATENT DOCUMENTS

DE        20121466 U1      2/2003
EP         1653651 A2      5/2006

(Continued)

OTHER PUBLICATIONS

Cena et al., "Evaluation of EtherCAT Distribued Clock Performance," IEEE Transactions on Industrial Informatics, Feb. 2012, pp. 20-29, vol. 8, No. 1.

(Continued)

*Primary Examiner* — Kibrom T Hailu
(74) *Attorney, Agent, or Firm* — Dorsey & Whitney LLP

(57) ABSTRACT

A method for operating a node in a communications network comprises the following steps: The node receives a reference time via the communications network. A transmit clock of the node, which was determined for an earlier clock cycle on the basis of a local clock of the node, is compared with the reference time. The local clock of the node is corrected on the basis of the comparison result. On the basis of the corrected local clock a transmit clock is determined to be used by the node for the current clock cycle.

17 Claims, 4 Drawing Sheets

(56) References Cited

U.S. PATENT DOCUMENTS

| | | | |
|---|---|---|---|
| 2004/0249982 A1 | 12/2004 | Arnold et al. | |
| 2005/0180466 A1* | 8/2005 | Franchuk | H04J 3/0638 370/503 |
| 2009/0135677 A1* | 5/2009 | Veillette | G04G 7/02 368/47 |
| 2011/0200051 A1 | 8/2011 | Rivaud et al. | |
| 2013/0039359 A1 | 2/2013 | Bedrosian | |
| 2013/0188453 A1* | 7/2013 | Hladik | G01V 1/22 367/76 |

FOREIGN PATENT DOCUMENTS

| | | |
|---|---|---|
| EP | 1510018 B1 | 11/2008 |
| WO | 2015155333 A1 | 10/2015 |

OTHER PUBLICATIONS

Henderson et al., "Sampling Synchronization with Gigabit Ethernet," 2009 (7 pages).
Chinese Office Action for Chinese Patent Application No. 201580001631.8, dated Feb. 2, 2018, English Translation of First Two Three Pages (3 pages).

* cited by examiner

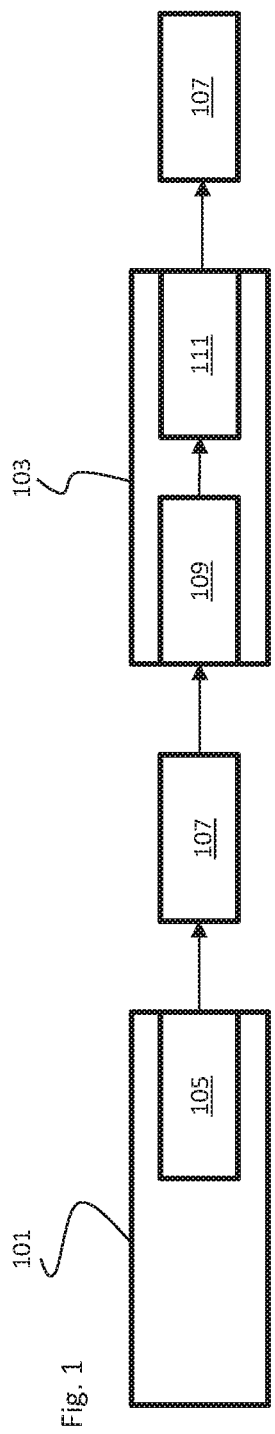
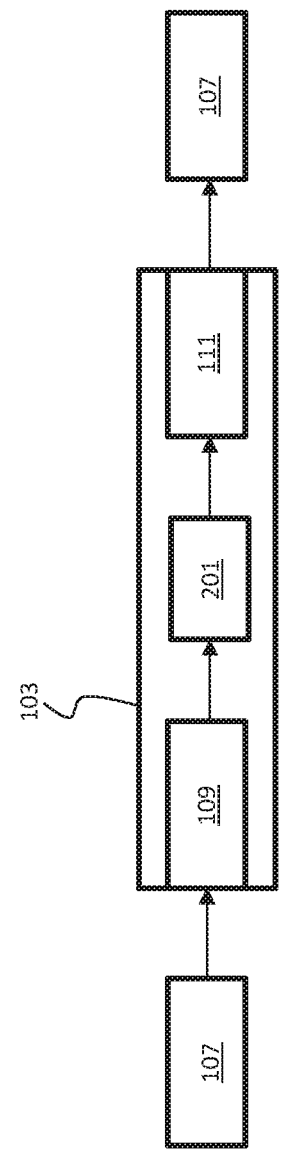

… (1) …

METHOD FOR OPERATING A NODE OF A COMMUNICATIONS NETWORK, A NODE AND A COMMUNICATIONS NETWORK

CROSS-REFERENCE TO RELATED APPLICATIONS

This is a continuation of PCT application PCT/EP2015/057848, filed Apr. 10, 2015, entitled METHOD FOR OPERATING A SUBSCRIBER OF A COMMUNICATION NETWORK, and claims priority to German Patent Application DE 102014105211.0, filed Apr. 11, 2014, entitled VERFAHREN ZUM BETREIBEN EINES TEILNEHMERS EINES KOMMUNIKATIONSNETZWERKS, each of which is incorporated by reference herein, in the entirety and for all purposes.

FIELD

The invention relates to a method for operating a node of a communications network. The invention also relates to a node and a communications network.

BACKGROUND

In an Ethernet network in which a node receives and processes the frames and forwards the frames to the next node, a time delay per node depends on a maximum variation of the transmit clocks of the nodes. A node n receives a frame using the transmit clock of the preceding node n−1, and transmits the same frame using its own transmit clock n. A maximum Ethernet frame is 1536 bytes long, i.e. for a precise transmit clock of 100 Mbits, the transmission of this frame would take: 1536 times 8 times 10 ns=122.88 μs. For a transmit-clock variation of 100 ppm=0.01%, the frame would be longer or shorter by 122.88 μs times 0.0001=12.29 ns. Thus there would be a maximum variation of 24.58 ns. This would equate to the transmission of approximately 2.5 bits at 100 Mbits. A variation depends only on the frame length in bytes, not on a transmission rate. For Gbits, the frame is only 1/10 as long. The general rule for the variation is [frame length in bits] times [maximum variation in ppm]. Were jumbo frames to be used (Ethernet frames longer than 1536 bytes), these values would be even higher. In the nodes there would need to be for each direction an internal FIFO (FIFO stands for "First In First Out") of at least this size, through which the frame must pass in order that a bit to be transmitted has actually already been received by a node. This extends a transmission time of the frame through the entire network by the maximum variation in the transmit clocks and the number of nodes.

SUMMARY

The invention provides an improved method for operating a node of a communications network, which method overcomes the known disadvantages and reduces a transmission time of a frame through the node. The invention further provides an improved node for a communications network and an improved communications network.

Examples

According to one aspect a method for operating a node in a communications network comprises the following steps: The node receives a reference time via the communications network. A transmit clock of the node, which was determined for an earlier clock cycle on the basis of a local clock of the node, is compared with the reference time. The local clock of the node is corrected on the basis of the comparison result. On the basis of the corrected local clock a transmit clock is determined to be used by the node for the current clock cycle.

According to a further aspect a node for a communications network comprises a communications interface for receiving a reference time via the communications network, a local clock, a controller for correcting the local clock on the basis of the received reference time and a determination unit for determining a transmit clock on the basis of the local clock. The controller is designed to compare a transmit clock of the node, which transmit clock was determined for an earlier cycle on the basis of the local clock of the node, with the reference time, and to correct the local clock of the node on the basis of the comparison result. The determination unit is designed to determine on the basis of the corrected local clock a transmit clock to be used for the current cycle.

According to a further aspect a communications network comprises a node. The node receives a frame using a receive clock and forwards the frame using a transmit clock, wherein the transmit clock is determined on the basis of a local clock in the node, wherein the local clock is synchronized to a reference time, wherein a transmit clock of the node, which transmit clock was determined for an earlier clock cycle on the basis of the local clock of the node, is compared with the reference time, and the local clock of the node is corrected on the basis of the comparison result, wherein a transmit clock to be used for the current clock cycle is determined on the basis of the corrected local clock.

BRIEF DESCRIPTION OF THE DRAWINGS

The invention will be explained in more detail below with reference to figures, in which, in each case in a schematic illustration:

FIG. 1 shows two nodes.

FIG. 2 shows the two nodes of FIG. 1, wherein one of the nodes comprises a FIFO memory.

DETAILED DESCRIPTION

Figure 3:
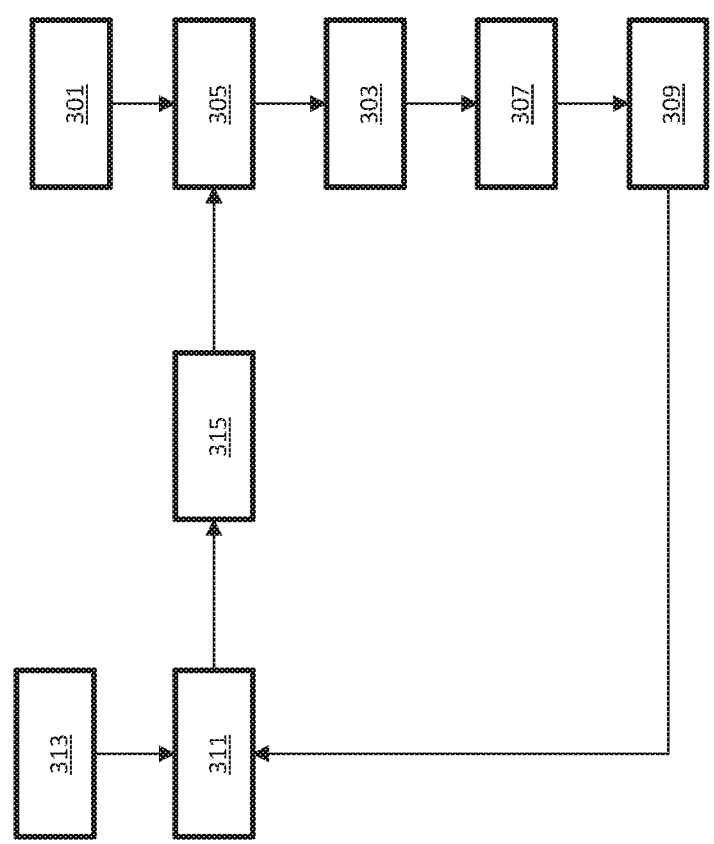
FIG. 3 shows a block diagram of a method for operating a node of a communications network.

The comments made in connection with the method apply analogously to the node and to the communications network, and vice versa. Specifically this means that embodiments of the node and/or of the communications network can arise from embodiments of the method and vice versa in any combination. Whenever the singular is used for "node" it shall be understood to mean the plural as well, and vice versa.

The same reference signs may be used below for the same features. In addition, for the sake of clarity, all the features may not be shown in all the drawings.

FIG. 1 shows two nodes 101 and 103.

The two nodes 101 and 103 are nodes of a communications network, for example an Ethernet network, in particular an EtherCAT network. The node 101 transmits a frame 107 using its transmit clock 105. The node 103 receives the frame 107 using its receive clock 109, which equals the transmit clock 105 of the node 101. The node 103 can forward the frame 107 using its own transmit clock 111. Before forwarding, the node 103 can preferably also process the frame 107. The time delay, i.e. the time that the frame takes to pass through the node, per node depends in particular on a maximum variation of the two transmit clocks 105 and 111 of the two nodes 101, 103.

A maximum Ethernet frame is 1536 bytes long, i.e. for a precise transmit clock of 100 Mbit, the transmission of this frame would take: 1536 times 8 times 10 ns=122.88 µs. For a transmit-clock variation of 100 ppm=0.01%, the frame would be longer or shorter by 122.88 µs times 0.0001=12.29 ns. Thus there would be a maximum variation of 24.58 ns. This would equate to the transmission of approximately 2.5 bits at 100 Mbits. A variation depends only on the frame length in bytes and not on a transmission rate. For Gbit, the frame is only ⅒ as long. The general rule for the variation is [frame length in bits] times [maximum variation in ppm]. Were jumbo frames to be used (Ethernet frames longer than 1536 bytes), these values would be even higher.

Thus in the two nodes 101 and 103 there would need to be for each direction an internal FIFO memory of at least this size, through which the frame 107 must pass in order that a bit to be transmitted has actually already been received by a node. This is shown in FIG. 2, in which the node 103 comprises a FIFO memory 201.

FIG. 3 shows a block diagram of a method for operating a node of a communications network.

A clock source 301 is provided. The clock source 301 of the node comprises a crystal, in particular an external crystal, and a PLL, which can generate a GHz clock. Other clock rates can also be provided, however, for example. The following description is nonetheless based on this GHz clock by way of example. It shall not have a limiting effect, however. A clock cycle corresponds to a cycle. A local clock 303 of the node is incremented in accordance with the GHz clock, in particular incremented by 10. Thus it is incremented per cycle. For a GHz clock and an incrementation value of 10, the local clock 303 thus has the units 100 ps. The transmit clock 309 is determined or formed from this local clock 303. Thus with units of 100 ps for the local clock 303 and a division by 10 according to the step 307, a GHz transmit clock is determined or formed. For other transmit clocks, other operations, in particular a division by a value other than 10, can be provided, which are applied to the local clock 303 in order to determine or form the transmit clock 309. The division value hence depends in particular on the clock rates, i.e. on the specific case.

The transmit clock 309 is fed back and compared with a reference time 313 according to a step 311. This is done by a comparator, for instance. The reference time 313 is provided by a master clock. It can be provided here, for example, that the reference time 313 has been averaged over a plurality of cycles and/or normalized by compensating for the propagation delay. The reference time 313 is preferably received cyclically, i.e. in every cycle, by means of a frame. The difference between the local clock 303 and the master clock, i.e. the difference between the reference time and the local clock 303, is provided to a controller 315, which can control the clock cycle of the local clock 303. The controller 315 advantageously causes incrementation of the local clock 303 in a cycle not by an incrementation value of 10 but only by an incrementation value of 9 (if the local clock 303 is running too fast compared with the master clock) or by 11 (if the local clock 303 is running too slowly compared with the master clock). In other words, the controller 315 selects the incrementation value 305 according to the difference, i.e. the result of the comparison, according to the step 311. Specifically this means that the local clock 303 is incremented according to the result of the comparison given by the step 311 by one of the following incrementation values: 9, 10 and 11. The transmit clock 309 is determined as explained above on the basis of the now accordingly compensated local clock 303, and said transmit clock 309 determined in this way is fed back again and compared with the reference time 313 received in the following cycle.

It is thus advantageously achieved that transmit clocks from nodes that are operated as stated above can now only differ from one another in the nanosecond range, i.e. «1 ppm.

The statements made above can be applied to any topology, for instance ring, line, star, tree and a combination thereof, in which any two nodes have different transmit clocks. In particular, the statements made above are not limited to 1 GHz and/or to the specified incrementation values (9, 10, 11). These should be understood merely as examples. Other incrementation values and/or other transmit clocks and/or other crystal clocks are possible. In addition, any internal control can in particular be performed differently. The crucial factor is preferably that a transmit clock is synchronized between two nodes by comparing the local clock 303 with a master clock. In principle, control can also be performed externally provided the object of the synchronous transmit clocks is achieved. This means specifically that by synchronizing the respective transmit clocks of two nodes to a common master clock, the transmit clocks of the nodes are the same, i.e. run synchronously with one another.

The transmit-clock synchronization is not limited to two nodes, but preferably also need not cover an entire communications network. It is already preferably advantageous if transmit clocks are synchronized in one or more communications subnetworks. The method can be applied in any communications subnetwork that is synchronized to a master clock of this communications subnetwork. A FIFO memory is preferably provided, i.e. in particular such a FIFO memory is enabled, at the junctions from a synchronized communications subnetwork to a non-synchronous node and/or communications subnetwork.

According to one embodiment, if a quality of the synchronization is insufficient to disable the FIFOs entirely, the achieved quality of the synchronization is evaluated (quality evaluation), and the correspondingly required latency of the FIFOs is set on the basis of the determined quality. This advantageously results in a shorter latency of the FIFOs than in the worst case, which is defined by the maximum variation of the transmit clocks.

Figure 4:
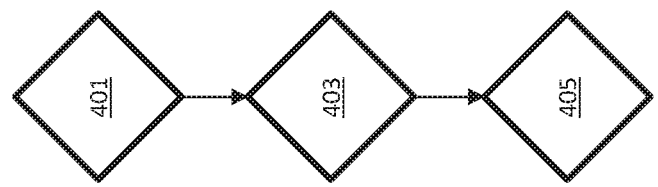
FIG. 4 shows a flow diagram of a method for operating a node of a communications network.

FIG. 4 shows a flow diagram of a method for operating a node of a communications network.

According to a step 401, the node receives a reference time via the communications network. In a step 403, a local clock of the node is corrected on the basis of the received reference time. This is done in particular in order to synchronize the local clock of the node to a master clock, which provides or defines the reference time. In a step 405, a transmit clock is determined on the basis of the corrected local clock. In an embodiment, a frame is transmitted by the node on the basis of the determined transmit clock.

Figure 5:
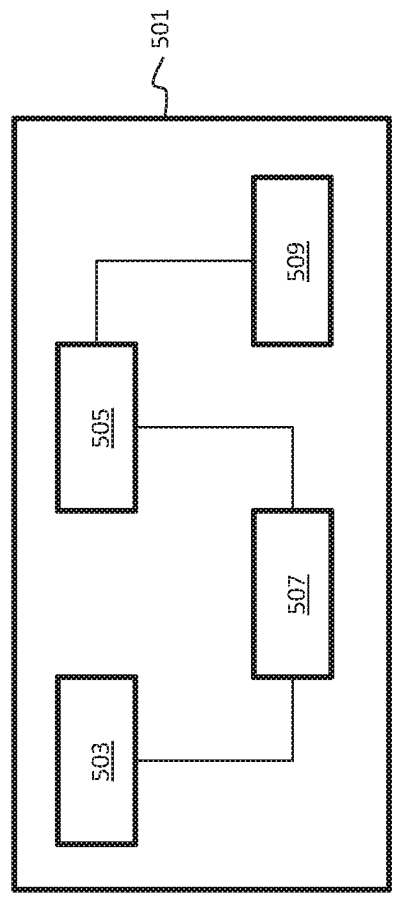
FIG. 5 shows a node for a communications network.

FIG. 5 shows a node 501 for a communications network.

The node 501 comprises a communications interface 503 for receiving a reference time in a first cycle via the communications network. The communications interface 503 can be designed, for example, to receive a frame. The frame may comprise the reference time, for instance. The communications interface 503 can be designed in particular to transmit a frame.

The node 501 comprises a local clock 505. In addition, the node 501 comprises a controller 507 for correcting the local clock 505 in the first cycle on the basis of the received reference time. Furthermore, the node 501 comprises a determination unit 509 for determining a transmit clock in the first cycle on the basis of the corrected local clock 505.

Figure 6:
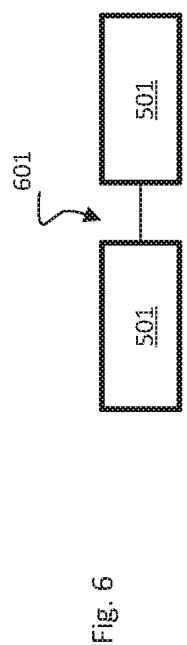
FIG. 6 shows a communications network.

FIG. 6 shows a communications network 601.

The communications network 601 comprises two nodes 501, which are connected one after the other. This means in particular that the one node 501 can transmit at its transmit rate a frame to the other node 501, and vice versa. Since, however, both transmit rates are synchronized, this advantageously eliminates or even entirely reduces a time delay.

In an embodiment, the nodes 101 and 103 shown in FIGS. 1 and 2 have a similar design to the node 501 shown in FIG. 5 and are operated in accordance with the method according to the invention.

Figure 7:
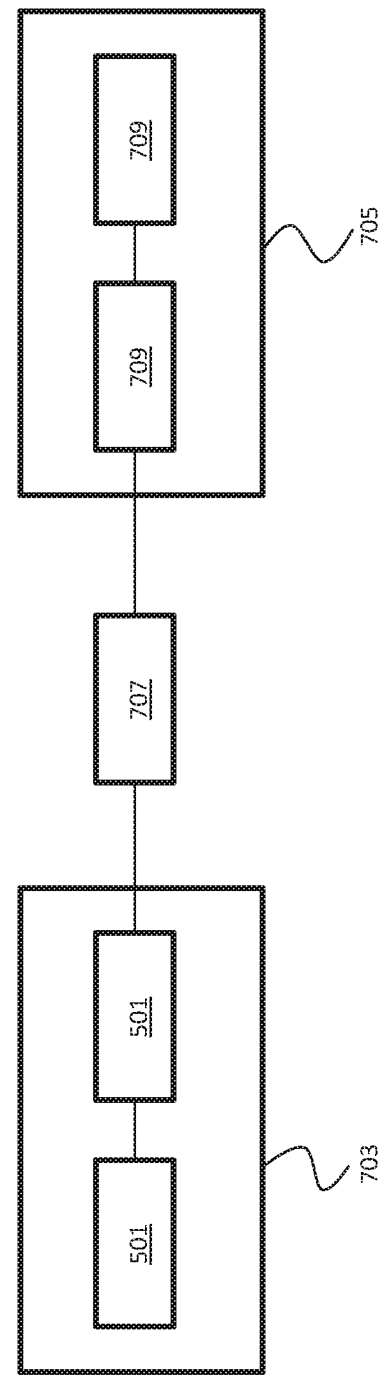
FIG. 7 shows another communications network.

FIG. 7 shows another communications network 701.

The communications network 701 comprises two communications subnetworks 703 and 705. At least two nodes 501 are assigned to the communications subnetwork 703. Nodes 709 are assigned to the communications subnetwork 705, although said nodes 709 are not operated in accordance with the method according to the invention. Thus this means in particular that the communications subnetwork 705 is not synchronized to a master clock. A FIFO memory 707 for storing frames that are transmitted from the communications subnetwork 703 to the communications subnetwork 705 and vice versa is provided between the two communications subnetworks 703 and 705. This FIFO memory 707 can correct or compensate for non-synchronous transmit rates of nodes of the two communications subnetworks 705 when transmitting frames from the one of the communications subnetworks to the other and vice versa.

In an embodiment, between nodes of which only one is operated according to the invention, i.e. is synchronized to a master clock, is provided a FIFO memory which can store frames that are transmitted back and forth between the two nodes.

A node whose local clock is synchronized to a master clock can be referred to as a synchronized node. A node whose local clock is not synchronized to a master clock can be referred to as an unsynchronized node.

The method of synchronizing respective transmit rates of two nodes of a communications network synchronizes a local clock of each of the nodes to a common master clock, wherein the transmit rate of each node is determined on the basis of the synchronized local clock.

According to one aspect, a method for operating a node of a communications network is provided that comprises the following steps: In a first cycle, the node receives a reference time via the communications network, corrects a local clock of the node on the basis of the received reference time and determines a transmit clock on the basis of the corrected local clock.

According to another aspect, a node for a communications network is provided that comprises a communications interface for receiving a reference time in a first cycle via the communications network, a local clock, a controller for correcting the local clock in the first cycle on the basis of the received reference time, and a determination unit for determining a transmit clock in the first cycle on the basis of the corrected local clock.

According to another aspect, a communications network is provided that comprises two nodes according to the invention for a communications network, which nodes are connected directly one after the other so that one of the nodes can receive frames from the other node at the transmit rate of the other node, and can transmit at its transmit rate processed frames determined on the basis of the received frames.

According to another aspect, a computer program is provided that comprises program code for implementing the method for operating a node of a communications network when the computer program is executed on a computer, for instance at a node.

Thus the local clock of the node is corrected on the basis of a reference time. This has the effect that the local clock can be synchronized to a master clock, which master clock provides the reference time. The corrected clock is hence synchronized with the master clock. Hence advantageously the transmit clock is thereby likewise synchronized with the master clock via the local clock. Thus advantageously it is possible to determine a standard transmit clock for nodes operated in accordance with the method according to the invention. Thus this means in particular that these nodes have a standard transmit clock. This is because the respective local clocks of the nodes are synchronized to the master clock and thus have an identical local clock time. Since the transmit clock of a particular node is determined on the basis of the local clock of that node, the nodes have a common or standard transmit clock. Thus this means in particular that variations that may occur in the known prior art can be reduced or even eliminated completely. A transmission time of a frame through a node and in particular through the communications network is thereby reduced compared with the known prior art. In particular it is possible advantageously usually to dispense with a FIFO memory or for a FIFO memory that may be present to have a smaller memory size compared with the known prior art. This can advantageously reduce the memory capacity required.

According to one embodiment, the reference time can be provided by a master clock. Hence a master clock that provides the reference time is preferably provided. Such a master clock can be integrated or implemented in a node of the communications network, for instance.

Correcting the local clock of the node on the basis of the received reference time in particular has the effect of synchronizing the local clock to the master clock. The local clock hence runs synchronously with the master clock, typically within certain tolerance limits, for example an accuracy of better than 1 ppm can be achieved. According to the calculation relating to the known prior art performed in the introductory part of the description, it is hence possible to dispense with an internal FIFO memory with the result that there is no additional increase in the transmission time of the frame through the node. This is because the achieved accuracy can be better than 1 ppm.

According to one embodiment, the correction involves determining an incrementation value, which is used as the basis for incrementing the local clock.

An incremental value can be referred to particularly as an increment. Thus in particular an internal counter of the local clock is incremented. Hence this means particularly that if the local clock is running faster or slower than the master clock, i.e. is ahead or behind, then a suitable value, the incrementation value, can be determined according to the specific case in order to compensate for or correct the slow-running or fast-running.

According to another embodiment, a transmit clock, which was determined in a second cycle that precedes the first cycle in time, is compared with the reference time received in the first cycle, wherein the incrementation value is determined on the basis of the comparison. Thus an older transmit clock can advantageously be used for the comparison. The first cycle can preferably immediately follow the second cycle. This has the advantageous effect of a particularly simple correction.

In another embodiment, a quality of the correction is evaluated, wherein a latency of a FIFO memory of the node, which FIFO memory is provided for storing a received frame, is set according to the evaluated quality.

Latency defines a time delay between receiving a frame ("first in") and transmitting this frame ("first out"). Thus in particular this means that, thanks to the FIFO memory, it is still possible to compensate for any differences between the local clock and the master clock that may happen to exist after the correction. For this case, however, it is sufficient to select a latency of the FIFO that is less than when a maximum variation must be taken into account, as is the case in the known prior art. Thus even when there is a FIFO memory present, a transmission time of the frame through the node is still reduced compared with the known prior art. This is because the latency of the FIFO memory had to be chosen in this case to take account of the maximum possible variation.

In another embodiment, evaluating the quality involves comparing the transmit rate of the node with a transmit rate of a further node of the communications network, the latency being set on the basis of the comparison. The two nodes can preferably be connected directly one after the other.

Thus the latency can be selected according to the match between the two transmit rates of the respective nodes. Hence it is possible to compensate for any differences in the transmit rates which may remain even after correcting the respective local clocks of the nodes. The latency, however, does not need to be selected to be as high as in the known prior art. This is because in this case the latency had to be set such that it is possible to compensate for the maximum possible variation. Thus even when there is a FIFO memory present, a transmission time of a frame through the two nodes is reduced according to the invention.

In another embodiment, a cycle period is defined by a timing clock from a clock source of the node.

Thus preferably the clock source defines a clock cycle. The clock source can preferably comprise a crystal and/or a PLL, where the abbreviation "PLL" stands for "phase locked loop". Thus this means in particular that incrementation is performed in each cycle. Specifically this means that the local clock is incremented by the incrementation value in each cycle. The clock cycle corresponds to the cycle.

According to another embodiment, the determination involves selecting the incrementation value from a group of incrementation values.

This has the advantageous effect that the incrementation value is determined particularly easily. Selection is thus made in particular according to whether the local clock is running faster or slower, i.e. behind, the reference time, in other words faster or slower than the master clock.

According to one embodiment, the controller is designed to determine an incrementation value and to increment the local clock on the basis of the determined incrementation value for the purpose of correction.

In another embodiment, the controller is designed to compare a transmit clock, which was determined in a second cycle that precedes the first cycle in time, with the reference time received in the first cycle, and to determine the incrementation value on the basis of the comparison. The comparison can be performed by a comparator, for example. The comparator is preferably part of the controller.

In another embodiment, a FIFO memory is provided for storing a received frame, wherein a latency of the FIFO memory can be set according to an evaluated quality of the correction. The quality can be evaluated, for example, by the controller. For instance, a quality evaluator can be provided. The quality evaluator can preferably be part of the controller. The latency can be set, for example, by the controller.

In another embodiment, the latency can be set on the basis of a comparison of the transmit rate of the node with the transmit rate of a further node of the communications network. The quality evaluator can preferably perform this comparison. The latency can be set, for example, by the controller.

In another embodiment, a clock source is provided for defining a cycle period on the basis of a clock cycle from the clock source. The clock source is preferably designed to define a clock cycle. A clock cycle corresponds to a cycle. The clock source can comprise, for example, a crystal and/or a PLL, i.e. a phase locked loop.

In another embodiment, two communications subnetworks are provided, wherein the two nodes are assigned to one of the communications subnetworks, wherein a FIFO memory for storing frames transmitted from one of the communications subnetworks to the other, and vice versa, is provided between the two communications subnetworks.

Owing to the FIFO memory, the other communications subnetwork does not necessarily need nodes according to the invention, i.e. nodes that are operated according to the invention by means of the method. Thus in particular this means that the nodes of the other communications subnetwork can have no controller. Thus it is not essential to synchronize the nodes of this communications subnetwork to a master clock.

In one embodiment, a communications subnetwork has its own master clock to which are synchronized the respective local clocks of the nodes of the communications subnetwork. The communications subnetwork can be called specifically a synchronized communications subnetwork. Where there are a plurality of communications subnetworks, at least some, in particular all, can each preferably have a dedicated master clock to which are synchronized the respective local clocks of the nodes of the communications subnetwork. Such a communications subnetwork can be referred to specifically as a synchronized communications subnetwork. A communications subnetwork in which the respective local clocks of the nodes are not synchronized to a master clock can be referred to, for instance, as an unsynchronized communications subnetwork. In one embodiment, a common master clock can be provided for synchronizing the respective clocks of the nodes of a plurality of communications subnetworks. Thus in particular a FIFO memory is provided between a synchronized and an unsynchronized communications subnetwork, via which memory the frames must pass from the synchronized to the unsynchronized, and vice versa.

According to one embodiment, the nodes are nodes of an automation system or an automation unit. The automation system or automation unit can comprise, for instance, a control system and/or control unit. The nodes can preferably be nodes of a control system and/or a control unit. Thus the corresponding aforementioned system and/or unit comprises a plurality of nodes, which are connected to one another via a communications network. For instance a data line connects the nodes to one another. The data line, for example, connects the master to the nodes. Frames can be transmitted via the communications network so that frames can be passed from one node to the next node.

According to one embodiment, the communications network is an Ethernet communications network. The frame may be an Ethernet frame, for instance.

According to another embodiment, the communications network is an EtherCAT communications network, in particular based on the EtherCAT standard according to IEC standard "IEC 61158". The frame may be an EtherCAT frame, for instance.

According to another embodiment, the node can control and/or read an actuator and/or a sensor, in particular on the basis of a received frame. Hence this means in particular that the node can control and/or read an actuator and/or a sensor on the basis of a received frame. This is because a frame preferably contains information that defines how the node is meant to control and/or read an actuator and/or a sensor.

According to one embodiment, the node can process a received frame. Processing can comprise, for instance, reading data from the frame. Processing can comprise, for instance, writing data to the frame. The node can forward the processed frame, for example.

According to one embodiment, the node merely forwards the received frame, i.e. does not process said frame.

According to one embodiment, the communications network can have a topology selected from the following group of topologies: ring, line, star, tree and a combination thereof.

According to one embodiment, the correction can be compensated for the propagation delay. Specifically this means that correction includes propagation-delay compensation. Hence this means in particular that a propagation delay between the master clock and the node is determined and is taken into account in the correction. The propagation delay in particular refers to a time taken by a frame from the master clock to the node. Hence the local clock of the node is preferably corrected on the basis of the received reference time and a propagation delay between the node and the master clock.

According to one embodiment, the node transmits a frame, a processed frame or a forwarded frame on the basis of the determined transmit clock.

This invention has been described with respect to exemplary embodiments. It is understood that changes can be made and equivalents can be substituted to adapt these disclosures to different materials and situations, while remaining with the scope of the invention. The invention is thus not limited to the particular examples that are disclosed, but encompasses all the embodiments that fall within the scope of the claims.

What is claimed is:

1. A method for operating a node in a communications network,
    wherein frames passing through the node, the node receiving the frames from a preceding node using receive clocks and forwarding the frames to a subsequent node using transmit clocks, each transmit clock being determined on the basis of a local clock of the node, each receive clock being equal to a transmit clock of the preceding node transmitting the frame,
    the method comprising the following steps:
        the node receiving a reference time via the communications network;
        comparing a transmit clock of the node actually used for forwarding the frames to the subsequent node, the transmit clock being determined for an earlier clock cycle on the basis of the local clock of the node, with the reference time;
        correcting the local clock of the node on the basis of the comparison result; and
        determining on the basis of the corrected local clock a new transmit clock to be used by the node for the current clock cycle for forwarding the frames to the subsequent node.

2. The method as claimed in claim 1, wherein the local clock is incremented by an incrementation value, and wherein the correction involves adjusting the incrementation value.

3. The method as claimed in claim 1, wherein the reference time is received by the node in every clock cycle by means of a frame.

4. The method as claimed in claim 1, wherein the reference time is averaged over a plurality of clock cycles and/or normalized by compensating for the propagation delay.

5. The method as claimed in claim 1, wherein a quality of the correction is evaluated, and wherein a latency of a FIFO memory of the node, which FIFO memory is provided for storing a received frame, is set according to the evaluated quality.

6. The method as claimed in claim 1, wherein a clock period is defined by a clock cycle from a clock source of the node.

7. A node for a communications network,
    the node being designed to pass through frames, the node receiving the frames from a preceding node using receive clocks and forwarding the frames to a subsequent node using transmit clocks, each transmit clock being determined on the basis of a local clock of the node by a determination unit of the node, each receive clock being equal to a transmit clock of the preceding node transmitting the frame,
    the node comprising:
        a communications interface for receiving a reference time via the communications network, and
        a controller for correcting the local clock on the basis of the received reference time,
        wherein the controller is designed to compare a transmit clock of the node actually used for forwarding the frames to the subsequent node, the transmit clock being determined for an earlier cycle on the basis of the local clock of the node, with the reference time, and to correct the local clock of the node on the basis of the comparison result, and
        wherein the determination unit is designed to determine on the basis of the corrected local clock a new transmit clock to be used for the current cycle for forwarding the frames to the subsequent node.

8. The node as claimed in claim 7, wherein the local clock is designed to be incremented by an incrementation value, and wherein the controller is designed to adjust the incrementation value for the purpose of correcting the local clock.

9. The node as claimed in claim 7, which is designed to receive the reference time in every clock cycle by means of a frame.

10. The node as claimed in claim 7, wherein a FIFO memory is provided for storing a received frame, wherein a latency of the FIFO memory can be set according to an evaluated quality of the correction.

11. The node as claimed in claim 7, wherein a clock source is provided for defining a cycle period on the basis of a clock cycle from the clock source.

12. A communications network comprising a node,
the node being designed to pass through frames, the node receiving the frames from a preceding node using receive clocks and forwarding the frames to a subsequent node using transmit clocks, each transmit clock being determined on the basis of a local clock of the node by a determination unit of the node, each receive clock being equal to a transmit clock of the preceding node transmitting the frame,
wherein the local clock is synchronized to a reference time,
wherein a transmit clock of the node actually used for forwarding the frames to the subsequent node, the transmit clock being determined for an earlier clock cycle on the basis of the local clock of the node, is compared with the reference time, and the local clock of the node is corrected on the basis of the comparison result, and
wherein a new transmit clock to be used for the current clock cycle for forwarding the frames to the subsequent node is determined on the basis of the corrected local clock.

13. The communications network as claimed in claim 12, wherein the local clock is incremented by an incrementation value, and wherein the correction involves adjusting the incrementation value.

14. The communications network as claimed in claim 12, wherein the receive clocks equal transmit clocks of a further node, and the reference time is received by the further node by means of the frame.

15. The communications network as claimed in claim 12, wherein two communications subnetworks are provided, wherein a FIFO memory for storing frames transmitted from one of the communications subnetworks to the other, and vice versa, is provided between the two communications subnetworks.

16. The communications network as claimed in claim 15, wherein a latency of the FIFO memory can be set according to an evaluated quality of the correction.

17. The communications network as claimed in claim 12, wherein a clock source is provided for defining a cycle period on the basis of a clock cycle from the clock source.

* * * * *